(12) United States Patent
Behnen et al.

(10) Patent No.: US 8,024,656 B2
(45) Date of Patent: Sep. 20, 2011

(54) DATA ANALYSIS USING FACET ATTRIBUTES

(75) Inventors: Marion Behnen, Austin, TX (US); Richard L. Cole, Los Gatos, CA (US); Qi Jin, San Jose, CA (US); Timo Pfahl, Zurich (CH); Holger Pirk, Berlin (DE)

(73) Assignee: International Business Machines Corporation, Armonk, NY (US)

( * ) Notice: Subject to any disclaimer, the term of this patent is extended or adjusted under 35 U.S.C. 154(b) by 785 days.

(21) Appl. No.: 11/693,711

(22) Filed: Mar. 30, 2007

(65) Prior Publication Data

US 2008/0244433 A1 Oct. 2, 2008

(51) Int. Cl.
G06F 3/048 (2006.01)

(52) U.S. Cl. ......................... 715/711; 707/600

(58) Field of Classification Search .................. 715/705, 715/708, 711–713, 810, 841, 845, 853, 854; 707/3, 600
See application file for complete search history.

(56) References Cited

U.S. PATENT DOCUMENTS

| 6,671,680 | B1 * | 12/2003 | Iwamoto et al. ................. 707/3 |
| 6,831,668 | B2 | 12/2004 | Cras et al. |
| 7,007,029 | B1 | 2/2006 | Chen |
| 7,120,646 | B2 | 10/2006 | Streepy, Jr. |
| 7,130,836 | B2 | 10/2006 | Grosser et al. |
| 7,284,011 | B1 * | 10/2007 | Narayanaswamy et al. .. 707/102 |
| 7,676,460 | B2 * | 3/2010 | Morgan ................. 707/999.004 |
| 2002/0059195 | A1 * | 5/2002 | Cras et al. ......................... 707/3 |
| 2002/0087579 | A1 | 7/2002 | Chasanoff et al. |
| 2002/0099563 | A1 * | 7/2002 | Adendorff et al. ................. 705/1 |
| 2004/0044661 | A1 | 3/2004 | Allen et al. |
| 2004/0093296 | A1 * | 5/2004 | Phelan et al. .................... 705/36 |
| 2004/0138935 | A1 | 7/2004 | Johnson et al. |
| 2004/0139102 | A1 | 7/2004 | Vierich et al. |
| 2004/0181378 | A1 * | 9/2004 | Gilmore ............................ 703/6 |
| 2005/0080770 | A1 | 4/2005 | Lueder et al. |
| 2005/0283494 | A1 * | 12/2005 | Colossi et al. ................. 707/102 |
| 2006/0004703 | A1 | 1/2006 | Spivack et al. |
| 2006/0020523 | A1 * | 1/2006 | Song ................................ 705/27 |
| 2006/0026180 | A1 | 2/2006 | Kres |
| 2006/0053175 | A1 | 3/2006 | Gardner et al. |

(Continued)

FOREIGN PATENT DOCUMENTS

JP 411015897 A 1/1999

OTHER PUBLICATIONS

Xie, Xaixian, et al. "Exploratory Visualization of Multivariate Data with Variable Quality", IEEE Symposium on Visual Analytics Science and Technology, Nov. 2, 2006, pp. 183-190.

(Continued)

*Primary Examiner* — Weilun Lo
*Assistant Examiner* — Enrique W Iturralde
(74) *Attorney, Agent, or Firm* — Patterson & Sheridan, LLP (57) ABSTRACT

A method, computer program product, and system for analyzing data using a data warehouse application are provided. The method, computer program product, and system provide for displaying a facet in a user interface of the data warehouse application, the facet classifying a plurality of documents, and displaying a facet attribute of the facet in the user interface of the data warehouse application, the facet attribute corresponding to a characteristic associated with each of the plurality of documents classified by the facet.

24 Claims, 9 Drawing Sheets

U.S. PATENT DOCUMENTS

| | | | |
|---|---|---|---|
| 2006/0074836 A1 | 4/2006 | Gardner et al. | |
| 2006/0218157 A1 | 9/2006 | Sourov et al. | |
| 2006/0218159 A1 | 9/2006 | Murphy et al. | |
| 2006/0271565 A1 | 11/2006 | Acevedo-Aviles et al. | |
| 2006/0271568 A1 | 11/2006 | Balkir | |
| 2006/0288039 A1 | 12/2006 | Acevedo-Aviles et al. | |
| 2007/0106658 A1* | 5/2007 | Ferrari et al. | 707/5 |
| 2007/0226082 A1* | 9/2007 | Leal | 705/27 |
| 2008/0256040 A1* | 10/2008 | Sundaresan et al. | 707/3 |

OTHER PUBLICATIONS

Lodha, Suresh K., et al., "UFLOW: Visualizing Uncertainty in Fluid Flow", IEEE, http:www.cse.ucsc.edu/research/slvg/uflow.html, 1996, pp. 249-254.

Pham, Binh, et al., "Analysis of Visualisation Requirements for Fuzzy Systems", The Association for Computing Machinery, Inc., ACM, 2003, pp. 181-187.

Dossier No. ARC 920050081, "Online Analytic Processing in the Presence of Uncertainties".

Toon Calders, et al., "Searching for Dependencies At Multiple Abstraction Levels, ACM Transactions on Database Systems", vol. 27, No. 3, Sep. 2002, pp. 229-260.

Bing Liu, et al., "Rule Interestingness Analysis Using OLAP Operations", KDD 2006, Aug. 20-25, 2006, Philadelphia Pennsylvania, ACM 1-59593-339-5/06/0008.

Alfredo Cuzzocrea, "Providing Probabilistically-Bounded Approximate Answers to Non-Holistic Aggregate Range Queries in OLAP", DEIS Dept. University Calabria, Cosenza, Italy.

Riadh Ben Messaoud, "Enhanced Mining of Association Rules From Data Cubes", Laboratories ERIC—Universite Lumiere Lyon 2, Bron Cedex, France.

Nan Zhang, "Cardinality-Based Inference Control in OLAP Systems: An Information Theoretic Approach", DOLAP 2004, Nov. 12-13, 2004, Washington, D.C., Copyright 2004 ACM 1-58113-977-2/04/0011.

Priebe, et al., "Towards Integrative Enterprise Knowledge Portals", pp. 216-223, CIKM 2003, Nov. 2-8, 2003, New Orleans, USA, ACM 1-58113-723-0/03/0011.

JP Abstract, JP411015897A.txt; "Interactive Data Analysis Supporting Device and Medium Recording Interactive Data Analysis Supporting Program"; 2 pages, Jan. 22, 1999, Fujitsu Limited.

Rtolap; Wikipedia the free encyclopedia, "RTOLAP—Real Time OLAP", 2 pages.

Josiane Mothe et al., "DocCube: Multi-Dimensional Visualisation and Exploration of Large Document Sets", Institute de Recherche en Informatique de Toulouse, pp. 1-16.

* cited by examiner

DATA ANALYSIS USING FACET ATTRIBUTES

FIELD OF THE INVENTION

The present invention relates generally to analysis of data using a data warehouse application.

BACKGROUND OF THE INVENTION

Data is sometimes categorized or classified into facets (e.g., categories, classes, etc.) and analyzed through traversal of the facets. However, based solely on the facets, a user is unable to determine whether the data is properly classified or categorized (e.g., accurate, current, and so forth). Without this knowledge, the user's analysis of the data may be incorrect. Incorrect data analysis could lead to, for example, erroneous decision-making.

SUMMARY OF THE INVENTION

A method, computer program product, and system for analyzing data using a data warehouse application are provided. The method, computer program product, and system provide for displaying a facet in a first user interface of the data warehouse application, the facet classifying a plurality of documents, and displaying a facet attribute of the facet in the first user interface of the data warehouse application, the facet attribute corresponding to a characteristic associated with each of the plurality of documents classified by the facet. In one implementation, the data warehouse application allows faceted analysis to be simultaneously used with online analytical processing (OLAP) analysis. The characteristic associated with each of the plurality of documents may be a confidence characteristic.

In one implementation, the method, computer program product, and system further provide for displaying a value range of the facet attribute in the first user interface of the data warehouse application, the characteristic associated with each of the plurality of documents being expressed as a characteristic value, the characteristic value of at least one of the plurality of documents being within the value range displayed, and indicating a number of documents having a characteristic value within the value range in the first user interface of the data warehouse application. The facet attribute and the value range of the facet attribute may be displayed in response to a user action in the first user interface, such as a selection action on the facet.

In one implementation, responsive to a user selection of the value range displayed, the method, computer program product, and system provide for displaying, in the first user interface of the data warehouse application, each value within the value range that matches the characteristic value of at least one document, and indicating, for each value displayed, a number of documents having a matching characteristic value in the first user interface of the data warehouse application. The data warehouse application allows faceted analysis to be simultaneously used with online analytical processing (OLAP) analysis in one implementation.

In another implementation, the method, computer program product, and system further provide for displaying a graphical or table representation of the plurality of documents classified by the facet in a second user interface of the data warehouse application, and displaying a value range of the facet attribute in the first user interface of the data warehouse application, the characteristic associated with each of the plurality of documents being expressed as a characteristic value, the characteristic value of at least one of the plurality of documents being within the value range displayed. The first user interface of the data warehouse application may be a faceted user interface and the second user interface of the data warehouse application may be an OLAP user interface.

In one implementation, responsive to a user selection of the value range displayed, the method, computer program product, and system provide for updating the graphical or table representation in the second user interface of the data warehouse application to reflect the user selection of the value range. Update of the graphical or table representation may comprise limiting the graphical or table representation in the second user interface to the documents having a characteristic value within the value range.

DETAILED DESCRIPTION

The present invention generally relates to analysis of data using a data warehouse application. The following description is presented to enable one of ordinary skill in the art to make and use the invention and is provided in the context of a patent application and its requirements. The present invention is not intended to be limited to the implementations shown, but is to be accorded the widest scope consistent with the principles and features described herein.

Before documents are analyzed, each document may be classified or categorized into one or more facets (e.g., categories, classes, and so forth). The term document is used to refer to the smallest unit of data that can be returned as a result in response to a search request. Hence, a document can be, for instance, a text file, a portion of the text file, a table, one or more rows or columns of data from the table, an XML (Extensible Markup Language) data, and so forth.

Facets may be organized hierarchically. In other words, some facets may be "parent" facets while other facets are "child" facets (also referred to as "sub-facets") of particular "parent" facets. Depending on the number of levels in a facet hierarchy, a facet may be both a "parent" facet and a "child" facet.

Unlike traditional taxonomies where the order in which the categories are presented is fixed, facets that are on the same hierarchical level need not be presented in any particular order. In addition, not all facets need to be presented (e.g., facets that are not needed or applicable need not be presented). For example, a typical television guide may group programming first by day, then by time, title, and rating. With facets, one user can sort programming first by rating, then by title, time, and day, while another user can sort programming first by title, then by day and time. As a result, users have much more flexibility in the manner in which documents are analyzed with facets because users are not required to view all facets or traverse the facets in a particular order.

Online analytical processing (OLAP) is sometimes used in conjunction with facets to analyze documents. With OLAP, measures are derived from the data in documents and loaded into multi-dimensional data structures, such as cubes, multi-dimensional arrays, and the like, for analysis. A data warehouse application is one example of an application that may allow users to simultaneously use OLAP and facets to analyze data. Data warehouse applications that allow faceted analysis to be simultaneously used with OLAP analysis include both a faceted user interface, as well as an OLAP user interface. However, both user interfaces need not be used at the same time, such as when only faceted analysis is being used to analyze data or only OLAP analysis is being used to analyze data.

Although facets provide a flexible way to analyze documents, a user is not able to determine, for instance, how accurate, current, reliable, and so forth, the documents being analyzed are based solely on the facets. Hence, the user could make incorrect decisions based on misconceptions about the documents.

Figure 1:
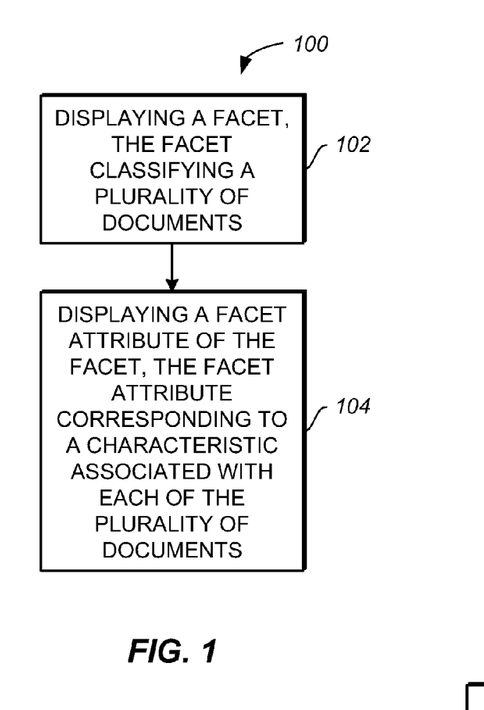
FIG. 1 depicts a process flow of a method for analyzing data using a data warehouse application according to an implementation of the invention.

Illustrated in FIG. 1 is a process 100 for analyzing data using a data warehouse application according to an implementation of the invention. At 102, a facet is displayed in a user interface of the data warehouse application. The facet classifies a plurality of documents. At 104, a facet attribute of the facet is displayed in the user interface of the data warehouse application. The facet attribute corresponding to a characteristic associated with each of the plurality of documents classified by the facet.

To give an example, assume that each of the plurality of documents contains sales data and that each of the plurality of documents is associated with a "staleness" characteristic that correlates to how old the sales data in the respective document is; for example, a different "staleness" might result from different update cycles for sales data from different regions. In addition, assume that the facet classifying the plurality of documents is "store sales." The facet attribute of the facet "store sales" can then be "store sales staleness." Hence, users analyzing the plurality of documents will be able to take into account the "staleness" of the sales data before making any decisions based on the plurality of documents.

Figure 2:
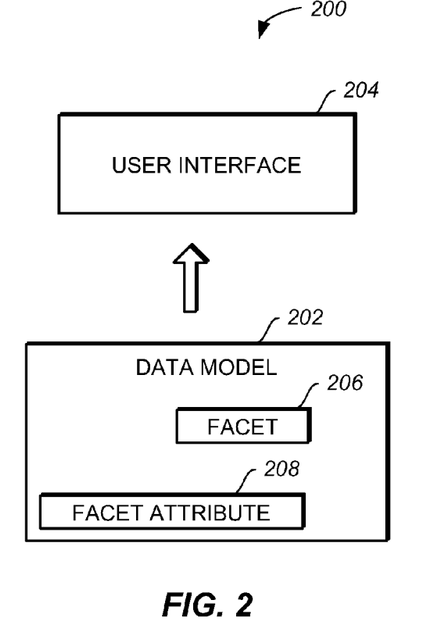
FIG. 2 illustrates a block diagram of a system according to an implementation of the invention.

FIG. 2 depicts a system 200 according to an implementation of the invention. System 200 includes a data model 202 and a user interface 204 of a data warehouse application in communication with data model 202. Data model 202 stores a facet 206 that classifies a plurality of documents (not shown). In one implementation, the plurality of documents classified by facet 206 may also be stored in data model 202.

A facet attribute 208 of facet 206 is also stored in data model 202. Facet attribute 208 corresponds to a characteristic associated with each of the plurality of documents classified by facet 206. Characteristics that may be associated with a document include, for example, staleness (e.g., correlates to how fresh/up-to-date/current the document is), confidence (e.g., correlates to a degree of confidence in the accuracy of the document), reliability (e.g., correlates to how trustworthy the source of the document is), popularity (e.g., correlates to how often the document is used), size (e.g., correlates to a memory size of the document), and the like.

User interface 204 of the data warehouse application displays facet 206 and facet attribute 208 of facet 206 stored in data model 202. In one implementation, data model 202 is also part of the data warehouse application. Facet 206 and facet attribute 208 may be stored in data model 202 and displayed in user interface 204 in response to a search request received by the data warehouse application.

Figure 3A:
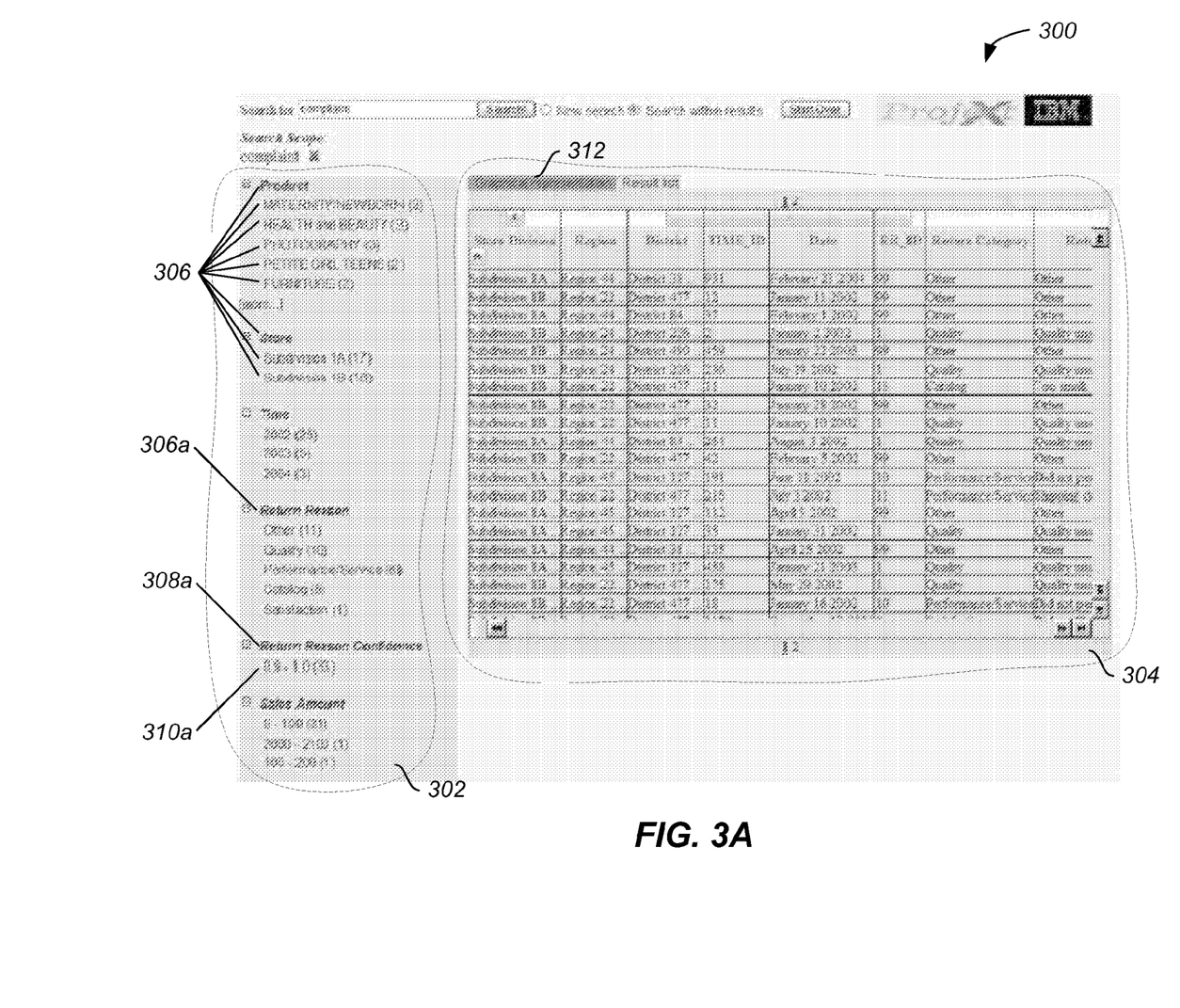
FIGS. 3A-3D show sample screenshots of a data warehouse application according to an implementation of the invention.

Shown in FIGS. 3A-3D are sample screenshots of a data warehouse application 300 according to an implementation of the invention. Data warehouse application 300 includes a faceted user interface 302 and an OLAP user interface 304. In FIG. 3A, faceted user interface 302 is displaying a plurality of facets 306 that classify a plurality of documents (not shown). The plurality of facets 306 includes "parent" facets, such as "Product," "Store," "Time," "Return Reason," and "Sales Amount," as well as "child" facets, such as "MATERNITY/ NEWBORN," "HEALTH and BEAUTY," "PHOTOGRAPHY," "PETITE GIRL TEENS," "FURNITURE," "Subdivision 1A," "Subdivision 1B," "2002," "2003," "2004," "Other," "Quality," "Performance/Service," "Catalog," "Satisfaction," "0-100," "2000-2100," and "100-200."

In the implementation, to the right of each "child" facet is a number in parenthesis. The number represents a number of documents classified by the particular "child" facet. In other implementations, such indications may not be shown for some or all of the "child" facets, may be shown for some or all of the "parent" facets, or may be in different locations (e.g., to the left of or below each facet).

Faceted user interface 302 in FIG. 3A is also displaying a "Return Reason Confidence" facet attribute 308a for the "Return Reason" facet 306a. The "Return Reason Confidence" facet attribute 308a corresponds to a "Confidence" characteristic associated with each document classified by the "Return Reason" facet 306a. In the example, the "Confidence" characteristic correlates to a degree of confidence in the accuracy of a particular document and is expressed as a decimal value. In another implementation, the "Return Reason Confidence" facet attribute 308a is not initially displayed in faceted user interface 302 and is instead displayed in a pop-up window associated with the "Return Reason" facet 306a.

A value range 310a of the "Return Reason Confidence" facet attribute 308a is also displayed in faceted user interface 302. In addition, a number of documents having a "Confidence" characteristic value within the value range 310a is indicated. A characteristic value may be a discrete value, such as 0.99, or a value range, such as 0.91-0.92. Since all thirty-three documents classified by the "Return Reason" facet 306a have "Confidence" characteristic values within the value range 310a displayed, "Return Reason Confidence" facet attribute 308a has no other value ranges.

If a finer value range was used instead, for instance, 0.9-0.95, then there may be more than one value range for "Return Reason Confidence" facet attribute 308a. In addition, if the "Confidence" characteristic values of documents classified by the "Return Reason" facet 306a are all discrete values, then discrete values of the "Return Reason Confidence" facet attribute 308a corresponding to the discrete "Confidence" characteristic values of documents may be displayed in faceted user interface 302a. Further, if the "Confidence" characteristic values of documents classified by the "Return Reason" facet 306a are a mix of discrete values and value ranges, then both discrete values and value ranges of the "Return Reason Confidence" facet attribute 308a may be displayed in faceted user interface 302a.

Displayed in OLAP user interface 304 is a table representation of the plurality of documents classified by facets 306. In the implementation, the table representation of the plurality of documents is a listing of the plurality of documents and the data values of those documents. Although not shown, a graphical representation of the plurality of documents is also available via a "Graphical representation" tab 312 in OLAP user interface 304.

Figure 3B:
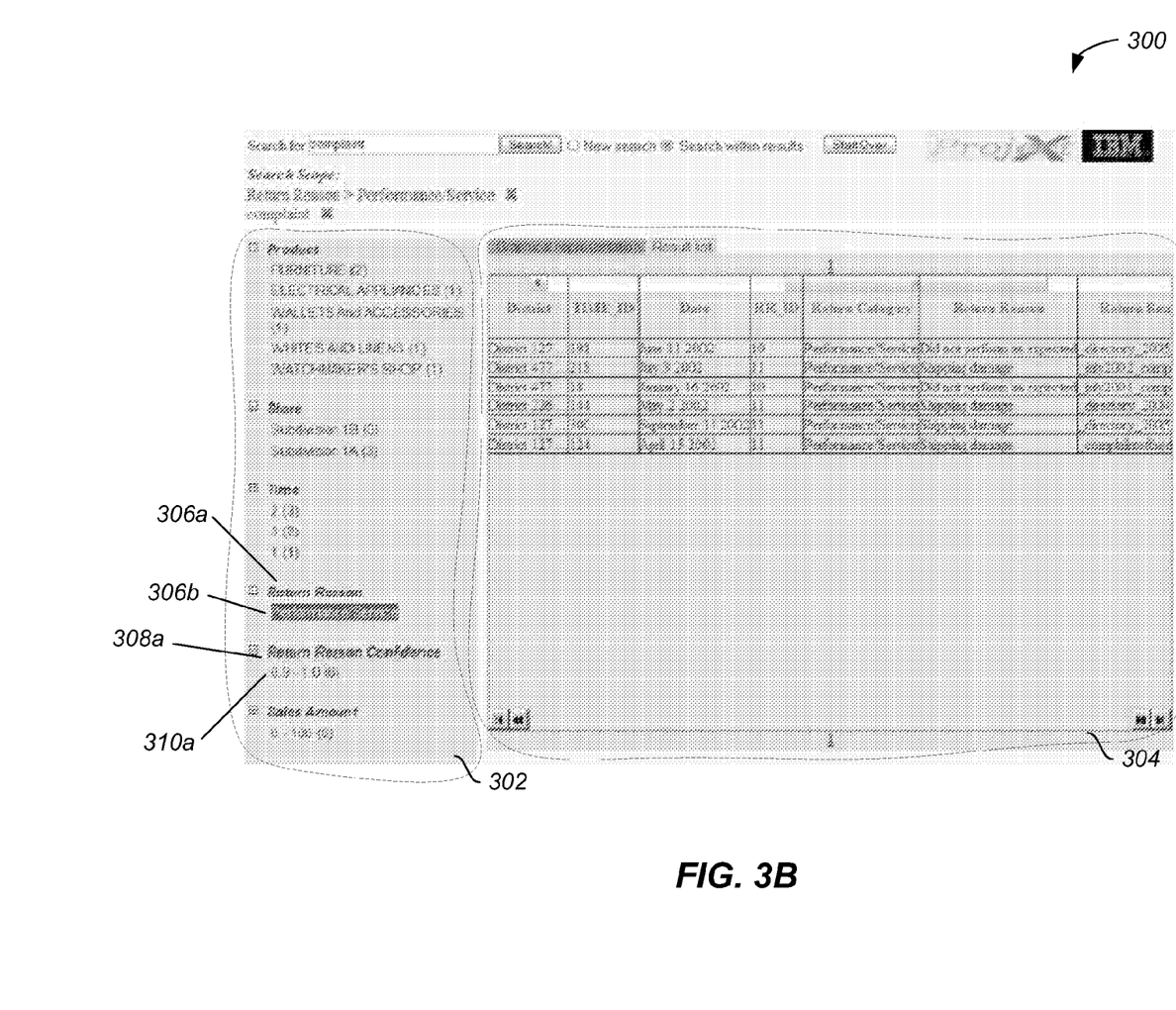

In FIG. 3B, "Performance/Service" facet 306b in faceted user interface 302 has been selected by a user. The selection may be made using, for instance, a pointing device (e.g., mouse, trackball, touchpad, and the like). As a result of the user selection, both the faceted user interface 302 and the OLAP user interface 304 are updated. Since it was indicated in FIG. 3A that only six documents are classified by the "Performance/Service" facet 306b, the OLAP user interface 304 in FIG. 3B has been updated to display only those six documents and their respective data values. In addition, faceted user interface 302 has been updated to display only those facets that classify one or more of the six documents.

Figure 3C:
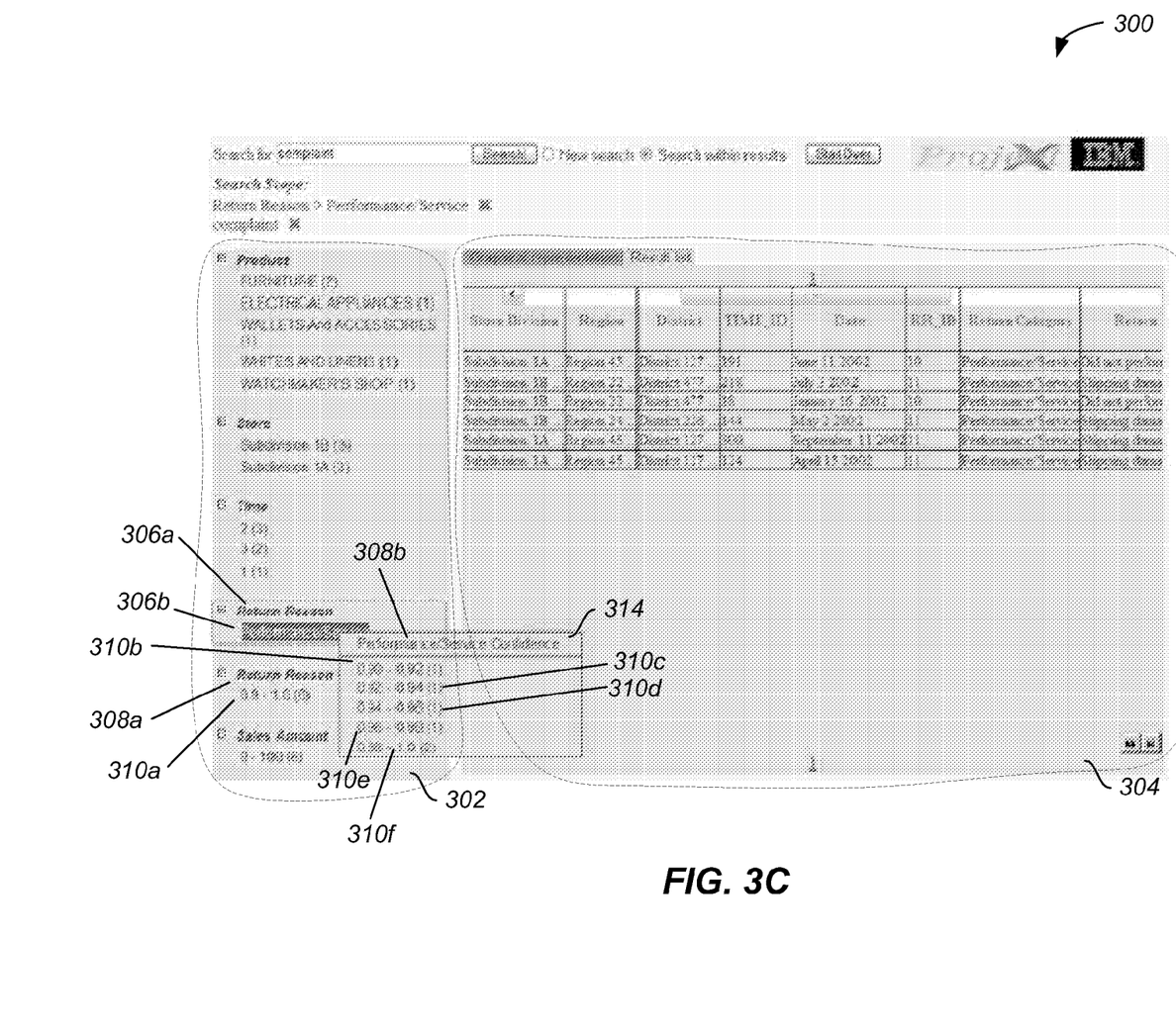

A facet attribute 308b is displayed in FIG. 3C for the "Performance/Service" facet 306b. The "Performance/Service Confidence" facet attribute 308b, similar to the "Return Reason Confidence" facet attribute 308a, corresponds to a "Confidence" characteristic associated with each document classified by the "Performance/Service" facet 306b, which is also expressed as a decimal value. However, unlike the "Return Reason Confidence" facet attribute 308a, the "Performance/Service Confidence" facet attribute 308b is displayed in response to a user action in faceted user interface 302. The user action may be, for instance, a selection action on the "Performance/Service" facet 306b (e.g., a right pointer click on the facet, hovering a pointer over the facet for a predetermined period of time, highlighting the facet then pressing 'Enter', or the like).

Five value ranges 310b-310f for the "Performance/Service Confidence" facet attribute 308b are also displayed. Similar to value range 310a, to the right of each of the value ranges 310b-310f, a number of documents having a "Confidence" characteristic value within the respective value range is indicated. In the example, only value range 310f has more than one document having a "Confidence" characteristic value within the value range. Even though facet attribute 308b and value ranges 310b-310f are displayed in a separate pop-up window 314 in the implementation, it need not be displayed as such. For example, facet attribute 308b and value ranges 310b-310f can be displayed in similar fashion as facet attribute 308a and value range 310a.

Figure 3D:
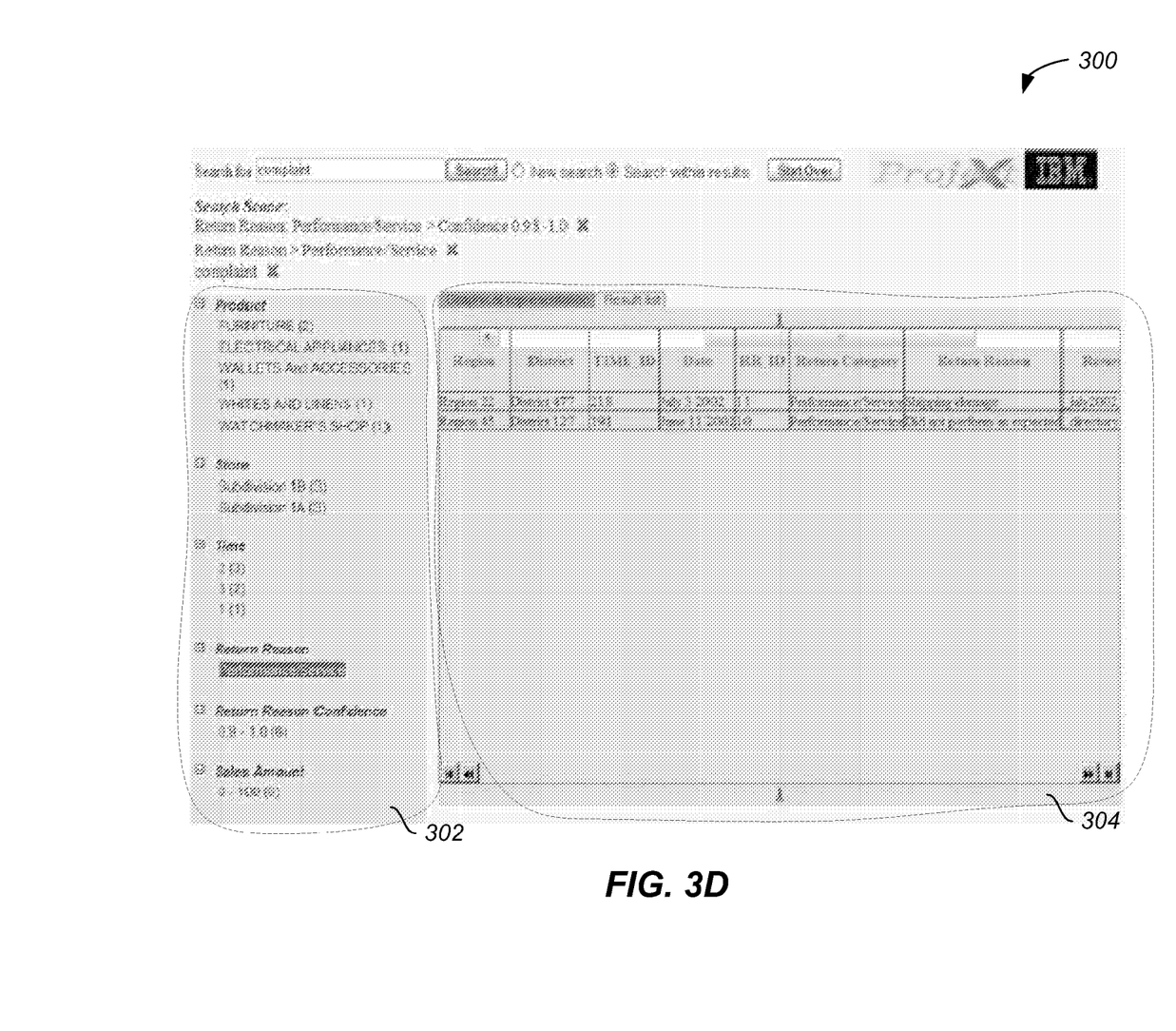

The sample screen shot in FIG. 3D of data warehouse application 300 is after user selection of the "0.98-1.0" value range 310f of the "Performance/Service Confidence" facet attribute 308b. As shown, OLAP user interface 304 has been updated to display the only two documents that have a "Confidence" characteristic value within the selected value range 310f. In the example, the only change to faceted user interface 302 is the disappearance of pop-up window 314. Faceted user interface 302 could, alternatively, be updated to display only the facets that classify the two documents, similar to what happened after the "Performance/Service" facet 306b was selected in FIG. 3B.

Figure 4:
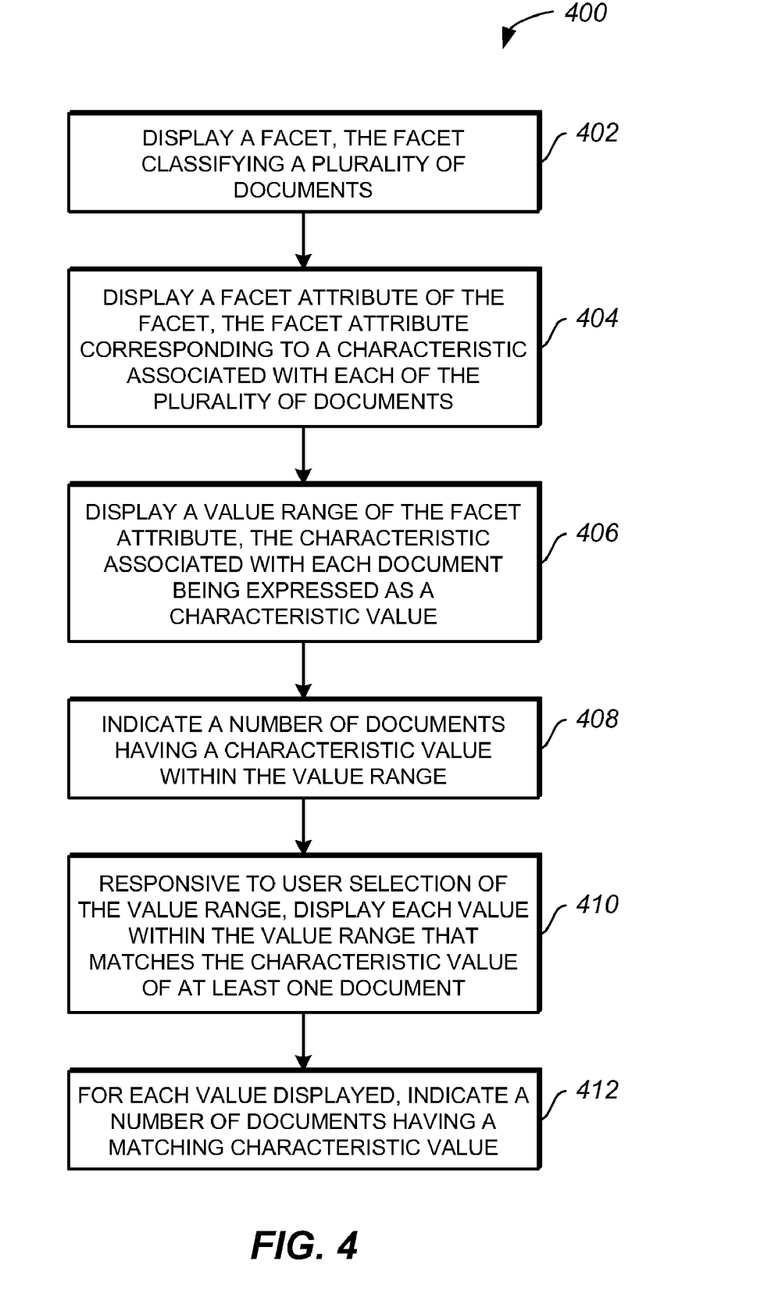
FIG. 4 is a process flow of a method for analyzing data using a data warehouse application according to an implementation of the invention.

FIG. 4 illustrates a process 400 for analyzing data using a data warehouse application according to an implementation of the invention. At 402, a facet is displayed in a user interface of the data warehouse application. The facet classifies a plurality of documents. At 404, a facet attribute of the facet is displayed in the user interface of the data warehouse application. The facet attribute corresponds to a characteristic associated with each of the plurality of documents.

At 406, a value range of the facet attribute is displayed in the user interface of the data warehouse application. In the implementation, the characteristic associated with each of the plurality of documents is expressed as a characteristic value and the characteristic value of at least one of the plurality of documents is within the value range displayed. The characteristic value can be a numeric value, a text value, or something else.

At 408, a number of documents having a characteristic value within the value range is indicated in the user interface of the data warehouse application. In one implementation, the facet attribute and the value range of the facet attribute are displayed in response to a user action in the user interface. The user action may be, for instance, a selection action on the facet.

In response to a user selection of the value range displayed, each value within the value range that matches the characteristic value of at least one document is displayed in the user interface of the data warehouse application at 410. For each value displayed, a number of documents having a matching characteristic value is indicated in the user interface of the data warehouse application at 412.

To give an example, assume that the value range displayed is 0.9-1.0, that five documents have characteristic values within the value range displayed, and that the characteristic values of those five documents are 0.91, 0.993, 0.9621, 0.957, and 0.98125. In the implementation, those five characteristic values will be the values displayed in the user interface. In another implementation, the values displayed may be standardized (e.g., all the values have the same decimal place). Hence, if all the values displayed are to the hundredth decimal place (e.g., 0.91), then the characteristic values may have to be rounded up or down. As a result, only four values will be displayed in the user interface since characteristic values 0.9621 and 0.957 will both round to 0.96.

Figure 5:
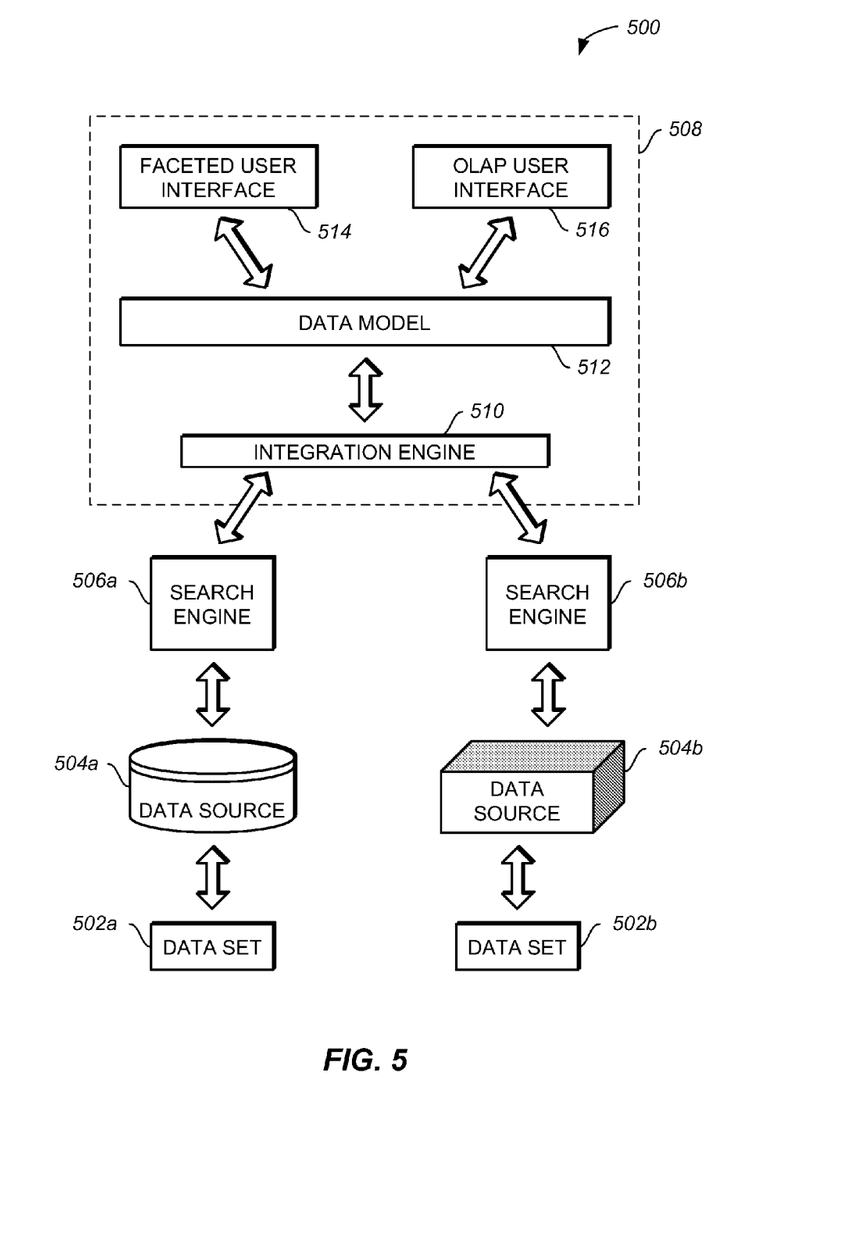
FIG. 5 depicts a block diagram of a system according to an implementation of the invention.

Depicted in FIG. 5 is a system 500 according to an implementation of the invention. System 500 includes data sets 502a and 502b. A data set can be, for example, relational data (e.g., tables), structured data (e.g., XML files), or unstructured data (e.g., text files). In the implementation, data sets 502a and 502b are correlated to one another (e.g., can be mapped from one to the other). Data sources 504a and 504b are derived or created from data sets 502a and 502b, respectively. For instance, data source 504a may be a search index created from data set 502a and data source 504b may be a cube derived from data set 502b. Search index may include facets, facet attributes, and other metadata relating to documents in data set 502a.

Search engines 506a and 506b are provided in system 500 to search respective data sources 504a and 504b and data sets 502a and 502b. System 500 also includes a data warehouse application 508. Data warehouse application 508 includes an integration engine 510 that is in communication with search engines 506a and 506b. Integration engine 510 is operable to utilize both search engines 506a and 506b to retrieve data from data sources 504a-504b and data sets 502a-502b that satisfy a search request. Some or all of the data retrieved from data sources 504a-504b and/or data sets 502a-502b satisfying the search request is stored in a data model 512.

Data that is stored in data model 512 is then displayed in a faceted user interface 514 and an OLAP user interface 516. For instance, faceted user interface 514 may display one or more facets and/or facet attributes stored in data model 512, which are retrieved from data source 504a. OLAP user interface 516 may display a graphical representation of measures stored in data model 512, which are retrieved from data source 504b, and may display a table representation of documents stored in data model 512, which are retrieved from data set 502a and/or data set 502b.

Figure 6:
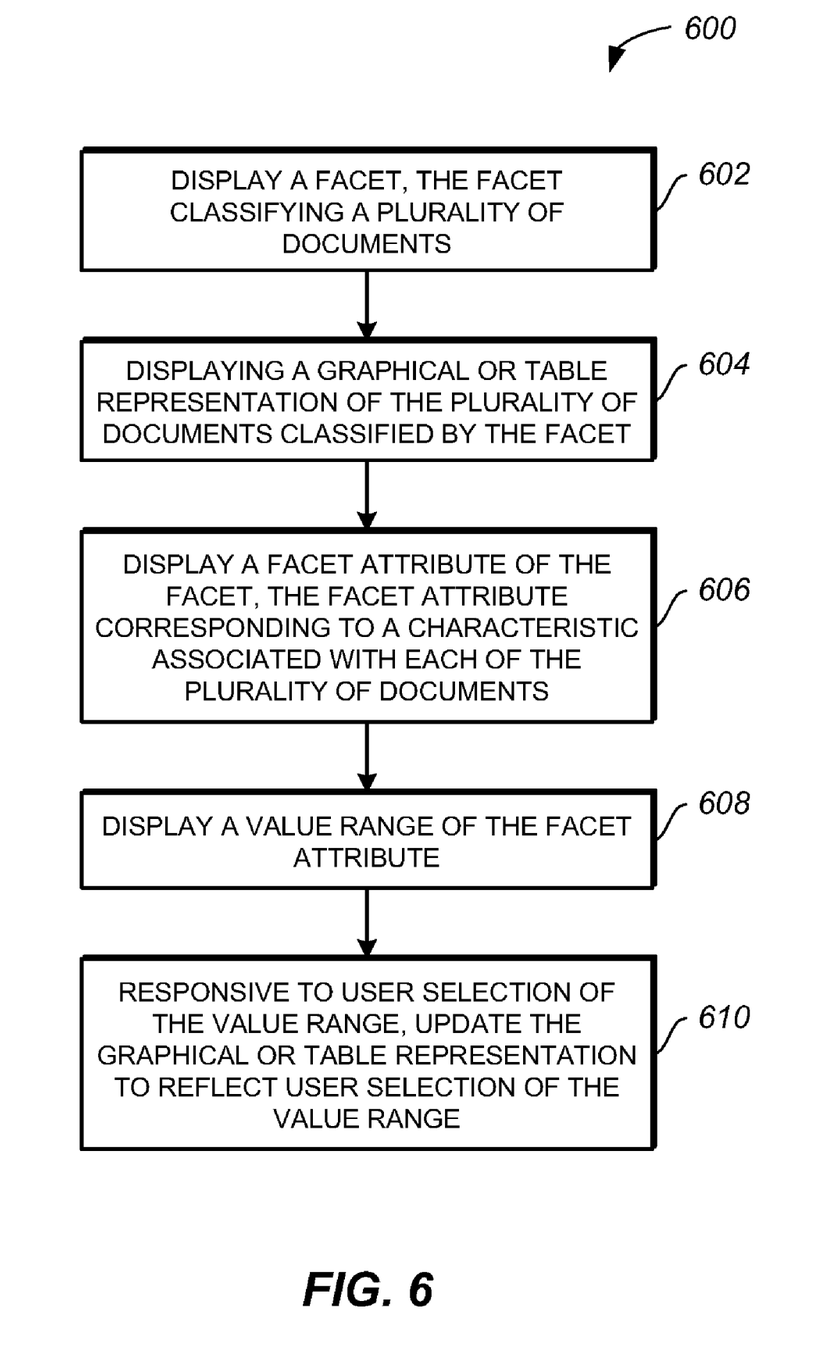
FIG. 6 illustrates a process flow of a method for analyzing data using a data warehouse application according to an implementation of the invention.

FIG. 6 shows a process 600 for analyzing data using a data warehouse application according to an implementation of the invention. At 602, a facet that classifies a plurality of documents is displayed in a faceted user interface of the data warehouse application. A graphical or table representation of the plurality of documents classified by the facet is displayed in an OLAP user interface of the data warehouse application at 604.

At 606, a facet attribute of the facet is displayed in the faceted user interface of the data warehouse application. The facet attribute corresponds to a characteristic associated with each of the plurality of documents. A value range of the facet attribute is displayed in the faceted user interface of the data warehouse application at 608. The characteristic associated with each of the plurality of documents is expressed as a characteristic value and the characteristic value of at least one of the plurality of documents is within the value range displayed.

In response to a user selection of the value range displayed in the faceted user interface, the graphical or table representation in the OLAP user interface of the data warehouse application is updated to reflect the user selection of the value range at 610. In one implementation, updating the graphical or table representation comprises limiting the graphical or table representation in the OLAP user interface to documents having a characteristic value within the value range.

By displaying facet attributes, users will be able to make more informed decisions as they are less likely to have misconceptions about the documents in which the decisions are based upon. Additionally, users have the option of ignoring documents with certain characteristics and focusing on a subset of the documents based on one or more facet attributes. Further, since each document may be associated with more than one characteristic, each facet classifying the document may have more than one facet attribute. Thus, users can simply look at only those facet attributes that are applicable to their analysis and decision-making.

The invention can take the form of an entirely hardware implementation, an entirely software implementation, or an implementation containing both hardware and software elements. In one aspect, the invention is implemented in software, which includes, but is not limited to, application software, firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk-read/write (CD-R/W).

Figure 7:
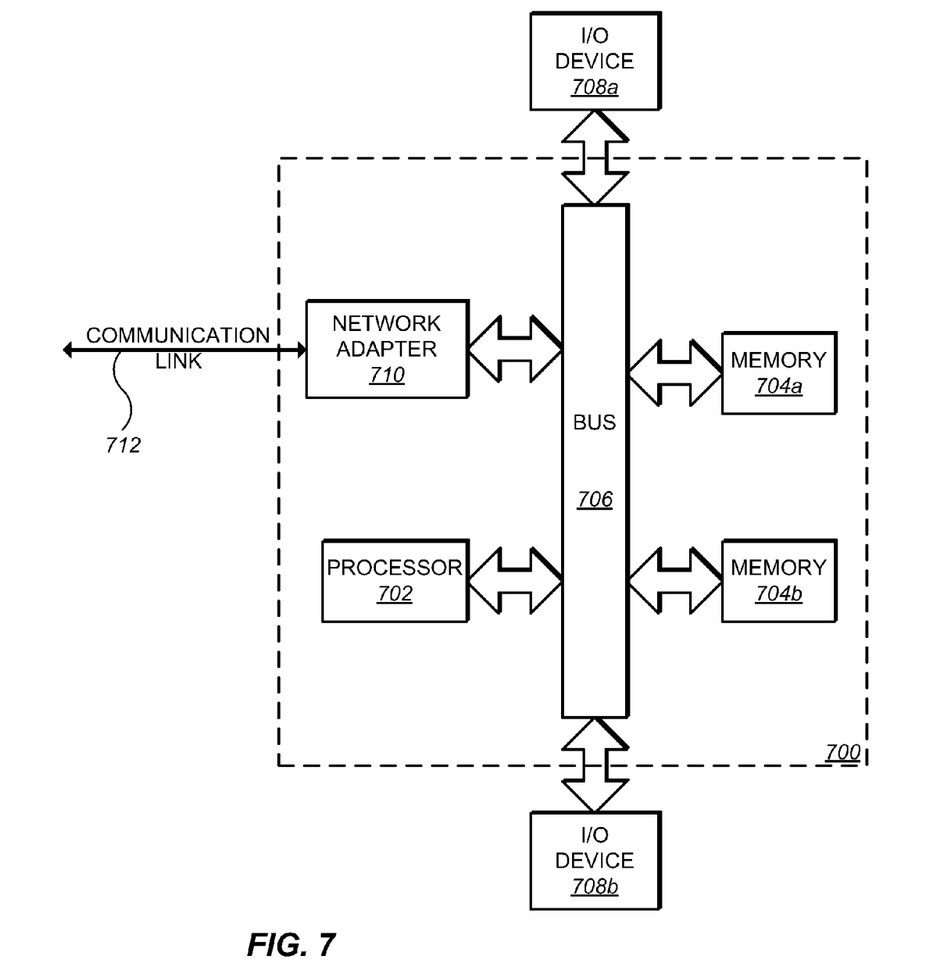
FIG. 7 illustrates a block diagram of a data processing system with which implementations of the invention can be implemented.

FIG. 7 depicts a data processing system 700 suitable for storing and/or executing program code. Data processing system 700 includes a processor 702 coupled to memory elements 704a-b through a system bus 706. In other implementations, data processing system 700 may include more than one processor and each processor may be coupled directly or indirectly to one or more memory elements through a system bus.

Memory elements 704a-b can include local memory employed during actual execution of the program code, bulk storage, and cache memories that provide temporary storage of at least some program code in order to reduce the number of times the code must be retrieved from bulk storage during execution. As shown, input/output or I/O devices 708a-b (including, but not limited to, keyboards, displays, pointing devices, etc.) are coupled to data processing system 700. I/O devices 708a-b may be coupled to data processing system 700 directly or indirectly through intervening I/O controllers (not shown).

In the implementation, a network adapter 710 is coupled to data processing system 700 to enable data processing system 700 to become coupled to other data processing systems or remote printers or storage devices through communication link 712. Communication link 712 can be a private or public network. Modems, cable modems, and Ethernet cards are just a few of the currently available types of network adapters.

While various implementations for analyzing data using a data warehouse application have been described, the technical scope of the present invention is not limited thereto. For example, the present invention is described in terms of particular systems having certain components and particular methods having certain steps in a certain order. One of ordinary skill in the art, however, will readily recognize that the methods described herein can, for instance, include additional steps and/or be in a different order, and that the systems described herein can, for instance, include additional or substitute components. Hence, various modifications or improvements can be added to the above implementations and those modifications or improvements fall within the technical scope of the present invention.

What is claimed is:

1. A method for analyzing data using a data warehouse application, the method comprising:

outputting, for display on a display device, a plurality of facets in a first user interface of the data warehouse application, each facet classifying a plurality of documents, wherein the plurality of facets allow navigating the plurality of documents along multiple paths corresponding to different orderings of the plurality of facets; and in response to receiving a user selection of a facet of the plurality of facets via the first user interface of the data warehouse application, outputting a facet attribute of the selected facet for display in one or more pop-up menus associated with the selected facet, the facet attribute corresponding to a characteristic associated with each of the plurality of documents classified by the selected facet, wherein the characteristic comprises at least one of document staleness, document confidence, document reliability, and document popularity wherein the facet attribute comprises: (i) an identifier for the facet attribute; (ii) a plurality of value ranges of the facet attribute; and (iii) for each value range of the plurality of value ranges, an associated count of documents of the plurality of documents having, for the characteristic, a characteristic value within the respective value range, each value range being selectable such that: (i) a representation of the plurality of documents in a second user interface of the data warehouse application is refreshed based on the respective value range and (ii)

each value within the respective value range is output for display in the one or more pop-up menus associated with the respective facet, the data warehouse application allowing faceted analysis to be simultaneously used with online analytical processing (OLAP) analysis.

2. The method of claim 1, wherein responsive to a user selection of one of the plurality of value ranges of the facet attribute, outputting, in the first user interface of the data warehouse application, each value within the value range that matches the characteristic value of at least one document; and for each value output, indicating a number of documents having a matching characteristic value in the first user interface of the data warehouse application.

3. The method of claim 1, further comprising:

outputting the representation of the plurality of documents classified by the facet in the second user interface of the data warehouse application, wherein the representation comprises at least one of a graphical representation and a table representation.

4. The method of claim 3, wherein responsive to a user selection of one of the plurality of value ranges of the facet attribute, updating the representation in the second user interface of the data warehouse application to reflect the user selection of the value range.

5. The method of claim 4, wherein updating the representation comprises:

limiting the representation in the second user interface to the documents having a characteristic value within the value range.

6. The method of claim 3, wherein the first user interface of the data warehouse application is a faceted user interface and the second user interface of the data warehouse application is an OLAP user interface.

7. The method of claim 1, wherein the characteristic associated with each of the plurality of documents is a confidence characteristic.

8. A system for analyzing data using a data warehouse application, the system comprising:

a data model storing a plurality of facets that each classifies a plurality of documents and a facet attribute of a facet of the plurality of facets, the facet attribute corresponding to a characteristic associated with each of the plurality of documents classified by the facet, wherein the characteristic comprises at least one of document staleness, document confidence, document reliability, and document popularity, wherein the facet attribute comprises: (i) an identifier for the facet attribute; (ii) a plurality of value ranges of the facet attribute; and (iii) for each value range of the plurality of value ranges, an associated count of documents of the plurality of documents having, for the characteristic, a characteristic value within the respective value range, wherein the plurality of facets allow navigating the plurality of documents along multiple paths corresponding to different orderings of the plurality of facets; and a first user interface of the data warehouse, the first user interface displaying the facet and the facet attribute of the facet stored in the data model, in response to receiving a user selection of the facet via the first user interface, wherein the facet attribute is displayed in one or more pop-up menus associated with the facet, and wherein each value range is selectable such that : (i) a representation of the plurality of documents in a second user interface of the data warehouse application is refreshed based on the respective value range and (ii) each value within the respective value range is output, by operation of one or more computer processors, for display in the one or more pop-up menus associated with the facet, the data warehouse application allowing faceted analysis to be simultaneously used with online analytical processing (OLAP) analysis.

9. The system of claim 8, wherein responsive to a user selection of one of the plurality of value ranges of the facet attribute, the first user interface:

displays each value within the value range that matches the characteristic value of at least one document, and for each value displayed, indicates a number of documents having a matching characteristic value.

10. The system of claim 8, wherein the system further comprises the second user interface of the data warehouse application, the second user interface displaying the representation of the plurality of documents classified by the facet, wherein the representation comprises at least one of a graphical representation and a table representation.

11. The system of claim 10, wherein responsive to a user selection of one of the plurality of value ranges of the facet attribute, the second user interface updates the representation to reflect the user selection of the value range.

12. The system of claim 11, wherein the second user interface updates the representation by limiting the representation to the documents having a characteristic value within the value range.

13. The system of claim 10, wherein the first user interface of the data warehouse application is a faceted user interface and the second user interface of the data warehouse application is an OLAP user interface.

14. The system of claim 8, wherein the data warehouse application allows faceted analysis to be simultaneously used with online analytical processing (OLAP) analysis.

15. A computer program product comprising a computer readable storage medium, the computer readable storage medium including a computer readable program for analyzing data using a data warehouse application, wherein the computer readable program when executed on a computer causes the computer to:

display a plurality of facets in a first user interface of the data warehouse application, each facet classifying a plurality of documents, wherein the plurality of facets allow navigating the plurality of documents along multiple paths corresponding to different orderings of the plurality of facets; and display a facet attribute of a facet of the plurality of facets in the first user interface of the data warehouse application in response to receiving a user selection of the facet via the first user interface, the facet attribute corresponding to a characteristic associated with each of the plurality of documents classified by the facet, wherein the characteristic comprises at least one of document staleness, document confidence, document reliability, and document popularity, wherein the facet attribute is displayed in one or more pop-up menus associated with the facet, wherein the facet attribute comprises: (i) an identifier for the facet attribute; (ii) a plurality of value ranges of the facet attribute; and (iii) for each value range of the plurality of value ranges, an associated count of documents of the plurality of documents having, for the characteristic, a characteristic value within the respective value range, each value range being selectable such that: (i) a representation of the plurality of documents in a second user interface of the data warehouse application is refreshed based on the respective value range and (ii) each value within the respective value range is output for display in the one or more pop-up menus associated with the facet, the data warehouse application allowing faceted analysis to be simultaneously used with online analytical processing (OLAP) analysis.

16. The computer program product of claim 15, wherein responsive to a user selection of one of the plurality of value ranges of the facet attribute, the computer readable program further causes the computer to:

display, in the first user interface of the data warehouse application, each value within the value range that matches the characteristic value of at least one document; and for each value displayed, indicate a number of documents having a matching characteristic value in the first user interface of the data warehouse application.

17. The computer program product of claim 15, wherein the computer readable program further causes the computer to:

display the representation of the plurality of documents classified by the facet in the second user interface of the data warehouse application, wherein the representation comprises at least one of a graphical representation and a table representation.

18. The computer program product of claim 17, wherein responsive to a user selection of one of the plurality of value ranges of the facet attribute, the computer readable program further causes the computer to:

update the representation in the second user interface of the data warehouse application to reflect the user selection of the value range.

19. The computer program product of claim 18, wherein update of the representation comprises:

limiting the representation in the second user interface to the documents having a characteristic value within the value range.

20. The computer program product of claim 17, wherein the first user interface of the data warehouse application is a faceted user interface and the second user interface of the data warehouse application is an OLAP user interface.

21. The computer program product of claim 15, wherein the characteristic associated with each of the plurality of documents is a confidence characteristic.

22. The method of claim 1, wherein each value range is selectable such that each value within the respective value range is output for display in the one or more pop-up menus associated with the selected facet, and wherein each value within the respective value range is selectable such that the representation of the plurality of documents in the second user interface of the data warehouse application is refreshed based on the respective value.

23. The system of claim 8, wherein each value range is selectable such that each value within the respective value range is output for display in the one or more pop-up menus associated with the facet, and wherein each value within the respective value range is selectable such that the representation of the plurality of documents in the second user interface of the data warehouse application is refreshed based on the respective value.

24. The computer program product of claim 15, wherein each value range is selectable such that each value within the respective value range is output for display in the one or more pop-up menus associated with the facet, and wherein each value within the respective value range is selectable such that the representation of the plurality of documents in the second user interface of the data warehouse application is refreshed based on the respective value.

* * * * *